C. SCHMIDT.
TROUGH.
APPLICATION FILED MAR. 15, 1919.

1,328,207.

Patented Jan. 13, 1920.
2 SHEETS—SHEET 1.

Inventor
C. Schmidt
By Victor J. Evans
Attorney

C. SCHMIDT.
TROUGH.
APPLICATION FILED MAR. 15, 1919.
1,328,207.
Patented Jan. 13, 1920.
2 SHEETS—SHEET 2.
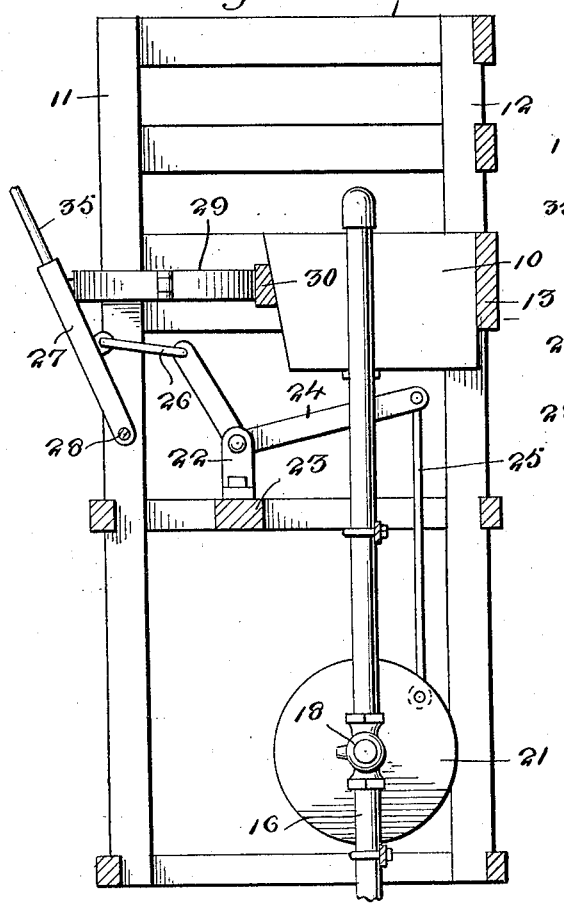
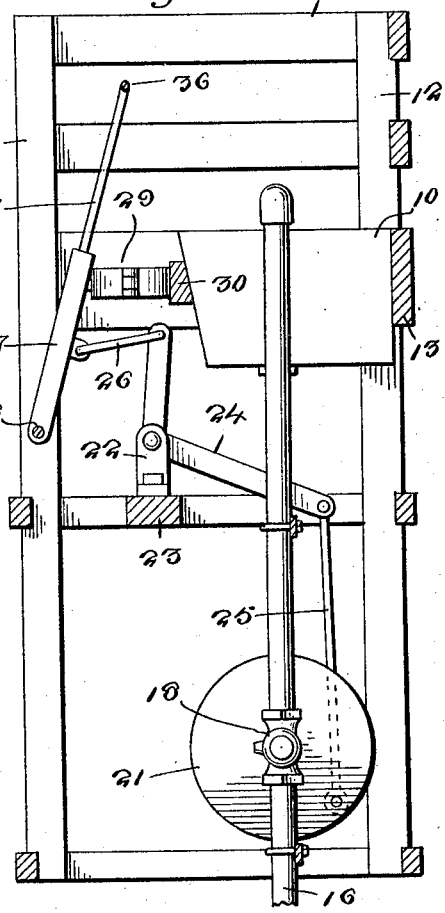
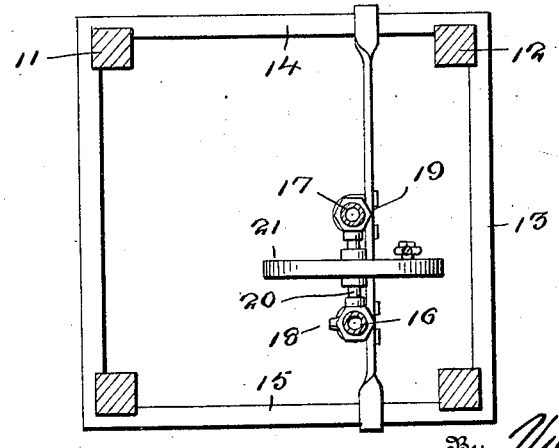
Inventor
C. Schmidt
By Victor J. Evans
Attorney

UNITED STATES PATENT OFFICE.

CHRIST SCHMIDT, OF EVERETT, WASHINGTON.

TROUGH.

1,328,207. Specification of Letters Patent. Patented Jan. 13, 1920.

Application filed March 15, 1919. Serial No. 282,906.

*To all whom it may concern:*

Be it known that I, CHRIST SCHMIDT, a citizen of the United States, residing at Everett, in the county of Snohomish and State of Washington, have invented new and useful Improvements in Troughs, of which the following is a specification.

This invention relates to improvements in stock watering troughs and aims to provide means for automatically supplying water to the trough while the animal is drinking and for automatically cutting off the supply when the animal is through, so that fresh water is supplied for each animal.

More specifically stated, the invention resides in the novel means employed for opening and closing the valves in the supply and discharge pipes and the arrangement of these valves, which permits of a simultaneous operation through the medium of an exceedingly simple arrangement of links and levers, while the pivotally actuated element, which operates the valves is actuated through pressure of the animal when reaching into the trough.

Other novel features and details of construction will appear as the following description is read in connection with the accompanying drawings.

In the drawings:

Fig. 3 is a vertical sectional view with the box in normal position.

Fig. 4 is a similar view showing the parts in the position assumed when an animal is drinking.

Fig. 5 is a horizontal sectional view.

Figure 1:
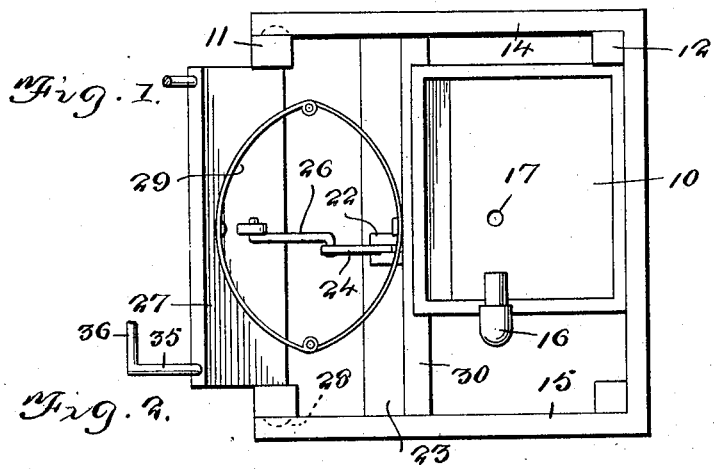
Figure 1 is a plan view of a watering trough embodying the present invention.
Figures 2, 6:
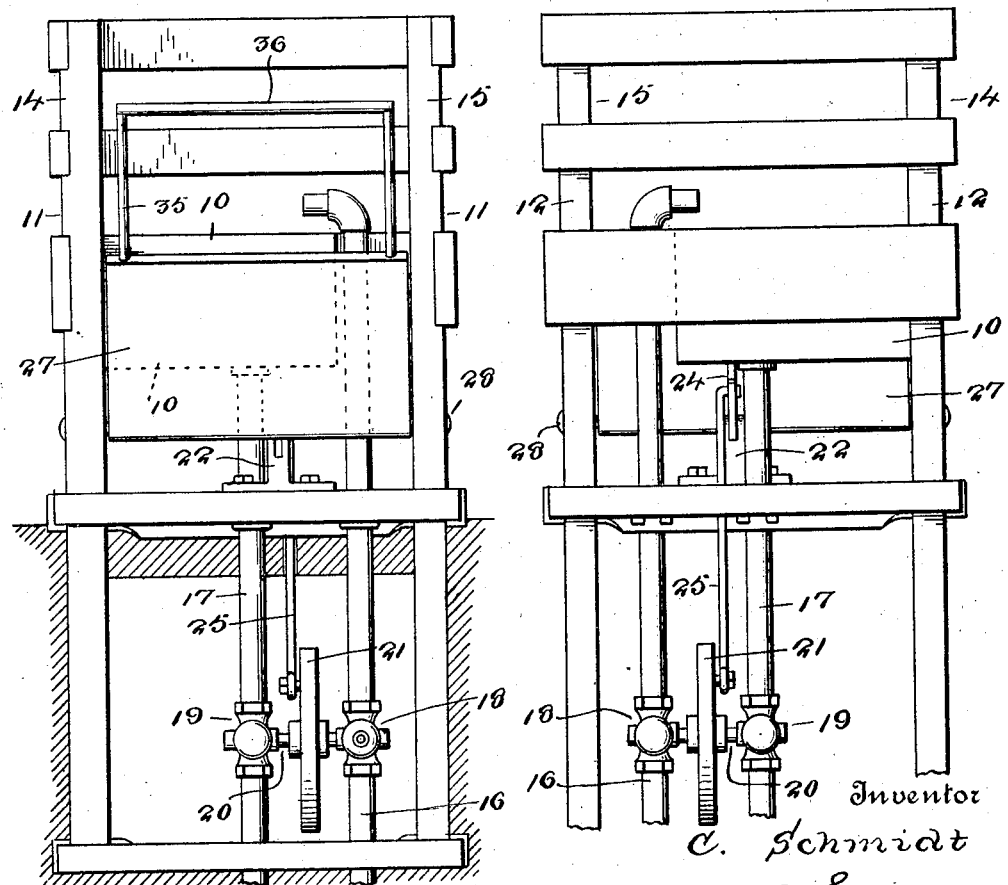
Fig. 2 is an end elevation of the same.
Fig. 6 is a view of a trough opposite to that shown in Fig. 2.

Referring to the drawings in detail, wherein like characters of reference denote corresponding parts, the trough which is shown at 10, is supported within a frame, the latter including uprights 11 and 12 and cross pieces 13. The trough 10 is secured adjacent the rear end of the frame, being spaced from the front end as shown in Fig. 1 and this frame upon its rear and both sides, is extended above the trough, so as to prevent access to the trough at these points, the extended portions of the frame being indicated at 14 and 15 respectively.

Extending from a suitable source of water supply, is a pipe 16, the said pipe extending upward and over the open top of the trough for the purpose of suplying water to the latter. Extending parallel to the pipe 16 and communicating with the bottom of the trough is a discharge pipe 17, both of these pipes being provided with oppositely located alined valves 18 and 19 respectively. The valves 18 and 19 have their stems connected through the medium of a short shaft or rod 20 and mounted upon this shaft or rod is a rotary element in the form of a wheel or disk 21. Mounted in a suitable bearing 22 secured upon a cross piece 23 carried by the frame, is a bell crank lever 24, the outer end of one arm of which is connected to the disk 21 through the medium of a rod 25. The opposite end of the bell crank 24 is connected through the medium of the link 26 to a horizontally pivoted spring actuated member 27, the latter being pivoted in bearings between the uprights 11 as shown at 28.

An animal reaching into the tank 10 will press inward the member 27 and through its connection with the disk 21, will rotate the disk sufficiently to open the valve 18 in the supply pipe 16 and close the valve 19 in the discharge pipe 17 to supply water to the trough for drinking purposes. When pressure is released from the member 27, the latter will be moved to its normal position through the medium of a spring 29, which is carried by a cross bar 30 and has its ends in contact with the said member. The movement of the member 27 to normal position will again rotate the disk 21 under the influence of the spring 29, whereupon the valve 18 will be closed and the valve 19 opened, cutting off the water supply and permitting the trough to drain. It will thus be seen that fresh water is admitted to the trough at each operation or inward movement of the member 27 and the trough drained as the said member is returned to its original position. This results in a sanitary drinking trough and prevents the communication of disease from one animal to another by having them drink from the same water.

In order to provide for the heights of different animals, for example, a horse or cow, the member 27 has extending from its upper edge a U-shaped member 35, the top horizontal bar 36 of which is spaced a sufficient distance from the upper edge of the member 27 to permit the passage of the head of a cow, so that the breast of the latter will bear against the member 27 to operate the valve 18. When the trough is used by a horse, whose breast is higher than that of the cow, the said horse may reach over the bar 36, while the latter will contact with the horse's breast to operate the valve 18, as previously described.

The invention is susceptible of various changes in its form, proportions and minor details of construction and the right is herein reserved to make such changes as properly fall within the scope of the appended claims.

Having described the invention, what is claimed is:

1. The combination with a watering trough having a water supply pipe and a discharge pipe arranged in parallelism, of a valve in each of said pipes, said valves being disposed in alinement, a shaft connecting the valve stems, so that when one valve is closed the other valve will be open, a horizontally pivoted upwardly and outwardly inclined member spaced from the trough, a spring interposed between said member and trough and means connecting said member and said shaft, whereby, when the member is rocked upon its pivot toward the trough the valve in the supply pipe will be opened and the valve in the discharge pipe closed and when said member is rocked in the opposite direction the valves will be returned to normal position.

2. The combination with an inclosed water trough having a valve controlled supply pipe and a valve controlled discharge pipe and an entrance opening for the inclosure, of a horizontally pivoted spring actuated obstruction member hingedly secured in said entrance opening and forming one wall of the trough inclosure, and means connecting the obstruction member and the valves for regulating the latter to control the supply and discharge of water to and from the trough.

In testimony whereof I affix my signature.

CHRIST SCHMIDT.